US008214868B2

(12) United States Patent
Hamilton et al.

(10) Patent No.: US 8,214,868 B2
(45) Date of Patent: Jul. 3, 2012

(54) FLEXIBLE TRAFFIC MANAGEMENT AND SHAPING PROCESSING FOR MULTIMEDIA DISTRIBUTION

(75) Inventors: Christopher W. Hamilton, Breinigsville, PA (US); David P. Sonnier, Austin, TX (US); Milan Zoranovic, Kanata (CA)

(73) Assignee: Agere Systems Inc., Allentown, PA (US)

( * ) Notice: Subject to any disclaimer, the term of this patent is extended or adjusted under 35 U.S.C. 154(b) by 1459 days.

(21) Appl. No.: 11/409,438

(22) Filed: Apr. 21, 2006

(65) Prior Publication Data

US 2007/0250635 A1    Oct. 25, 2007

(51) Int. Cl.
*H04N 7/173* (2011.01)
(52) U.S. Cl. ............... 725/94; 725/86; 725/87; 725/90; 725/91; 725/93; 725/95; 725/96; 725/97
(58) Field of Classification Search ............ 725/86–100, 725/37, 38, 65, 105, 126, 103, 114, 118, 725/120
See application file for complete search history.

(56) References Cited

U.S. PATENT DOCUMENTS

| | | | | |
|---|---|---|---|---|
| 6,510,553 | B1 * | 1/2003 | Hazra | 725/87 |
| 6,873,630 | B1 * | 3/2005 | Muller et al. | 370/356 |
| 2004/0034863 | A1 * | 2/2004 | Barrett et al. | 725/38 |
| 2004/0143850 | A1 * | 7/2004 | Costa | 725/115 |
| 2006/0031564 | A1 * | 2/2006 | Brassil et al. | 709/233 |
| 2006/0230176 | A1 * | 10/2006 | Dacosta | 709/235 |
| 2006/0242240 | A1 * | 10/2006 | Parker et al. | 709/205 |
| 2007/0076756 | A1 * | 4/2007 | Chan et al. | 370/468 |
| 2007/0130393 | A1 * | 6/2007 | Versteeg | 710/57 |

OTHER PUBLICATIONS

S. Deering, "Host Extensions for IP Multicasting," Request for Comments, RFC 1112, pp. 1-17, Aug. 1989.
H. Schulzrinne, "Real Time Streaming Protocol (RTSP)," Request for Comments, RFC 2326, pp. 1-55, Apr. 1998.
Agere Systems Inc., "Advanced PayloadPlus APP300, Access Network Processors," Products Brief, pp. 1-5, Apr. 2005.
B. Cain et al., "Internet Group Management Protocol, Version 3," Request for Comments, RFC 3376, pp. 1-53, Oct. 2002.

* cited by examiner

*Primary Examiner* — Pankaj Kumar
*Assistant Examiner* — Alazar Tilahun
(74) *Attorney, Agent, or Firm* — Ryan, Mason & Lewis, LLP

(57) ABSTRACT

Apparatus for distributing streaming multimedia to at least one end client over a network includes memory and at least one processor operatively connected to the memory. The processor is operative: (i) to receive the streaming multimedia from at least one multimedia source via at least one of a plurality of channels in the network; (ii) when a channel change request generated by the end client for changing a channel and corresponding multimedia content from the multimedia source is not detected, to deliver the at least one multimedia stream to the end client at a first data rate; and (iii) when the channel change request has been detected, to deliver the at least one multimedia stream to the end client at a second rate for a prescribed period of time after receiving the channel change request and, after the prescribed period of time, to deliver the at least one multimedia stream to the end client at the first data rate, wherein the second data rate is greater than the first data rate.

20 Claims, 5 Drawing Sheets

FLEXIBLE TRAFFIC MANAGEMENT AND SHAPING PROCESSING FOR MULTIMEDIA DISTRIBUTION

FIELD OF THE INVENTION

The present invention relates generally to data communications, and more particularly relates to techniques for distributing multimedia streams over a network.

BACKGROUND OF THE INVENTION

Traditionally, broadcast television was only distributed via cable, satellite, or terrestrial systems. Today, with the increase in Internet connection speeds, advancements in technology, the increase in total number of users online, and the decrease in connection costs, it has become increasingly more common to find television content, accessible freely over the Internet. Moreover, new Internet-only television content (e.g., content not distributed via cable, satellite, or terrestrial systems) has appeared. The widespread use of digital subscriber line (DSL) and the ever-increasing bandwidth capabilities offered by industry innovation (e.g., asymmetrical digital subscriber line 2 (ADSL2), very high bit-rate digital subscriber line (VDSL), etc.) have provided an ideal backdrop for new mechanisms for distributing multimedia streams, including, but not limited to, live television (e.g., Internet Protocol (IP) television (IPTV)), also referred to as multicasting, as well as stored multimedia, such as, for example, content on demand (e.g., interactive video, interactive gaming, video on demand (VOD)).

One of the primary barriers to wider adoption of broadband as a means for delivering multimedia content is streaming technology, both in terms of quality and cost to providers. From a quality standpoint, end client IPTV and media systems delivered over broadband, Ethernet/IP, wireline and/or wireless networks typically require a time-based buffer to be loaded at the end client system in order to prevent picture loss and/or degradation during channel change and playout. However, whenever a request for a channel change is initiated by an end client, the buffer must be cleared and subsequently filled with streaming data from the new channel. In the case of IPTV, this can result in dithering and/or a blank screen during startup while the buffer is being filled. For users who engage in "channel surfing" or who otherwise rapidly switch between channels of multimedia content, the momentary delay in delivering channel content can be particularly undesirable.

Accordingly, there exists a need for improved techniques for distributing multimedia content over a network which does not suffer from one or more of the problems exhibited by conventional multimedia distribution methodologies.

SUMMARY OF THE INVENTION

The present invention meets the above-noted need by providing, in illustrative embodiments thereof, a multimedia distribution architecture for more efficiently delivering streaming multimedia to subscribing clients in a manner which substantially eliminates dithering and/or reduces the delay in presenting streaming multimedia content to an end client commonly experienced when changing channels.

In accordance with one aspect of the invention, apparatus for distributing streaming multimedia to at least one end client over a network includes memory and at least one processor operatively connected to the memory. The processor is operative: (i) to receive the streaming multimedia from at least one multimedia source via at least one of a plurality of channels in the network; (ii) when a channel change request generated by the end client for changing a channel and corresponding multimedia content from the multimedia source is not detected, to deliver the at least one multimedia stream to the end client at a first data rate; and (iii) when the channel change request has been detected, to deliver the at least one multimedia stream to the end client at a second rate for a prescribed period of time after receiving the channel change request and, after the prescribed period of time, to deliver the at least one multimedia stream to the end client at the first data rate, wherein the second data rate is greater than the first data rate.

These and other features and advantages of the present invention will become apparent from the following detailed description of illustrative embodiments thereof, which is to be read in connection with the accompanying drawings.

DETAILED DESCRIPTION OF THE INVENTION

Figure 1:
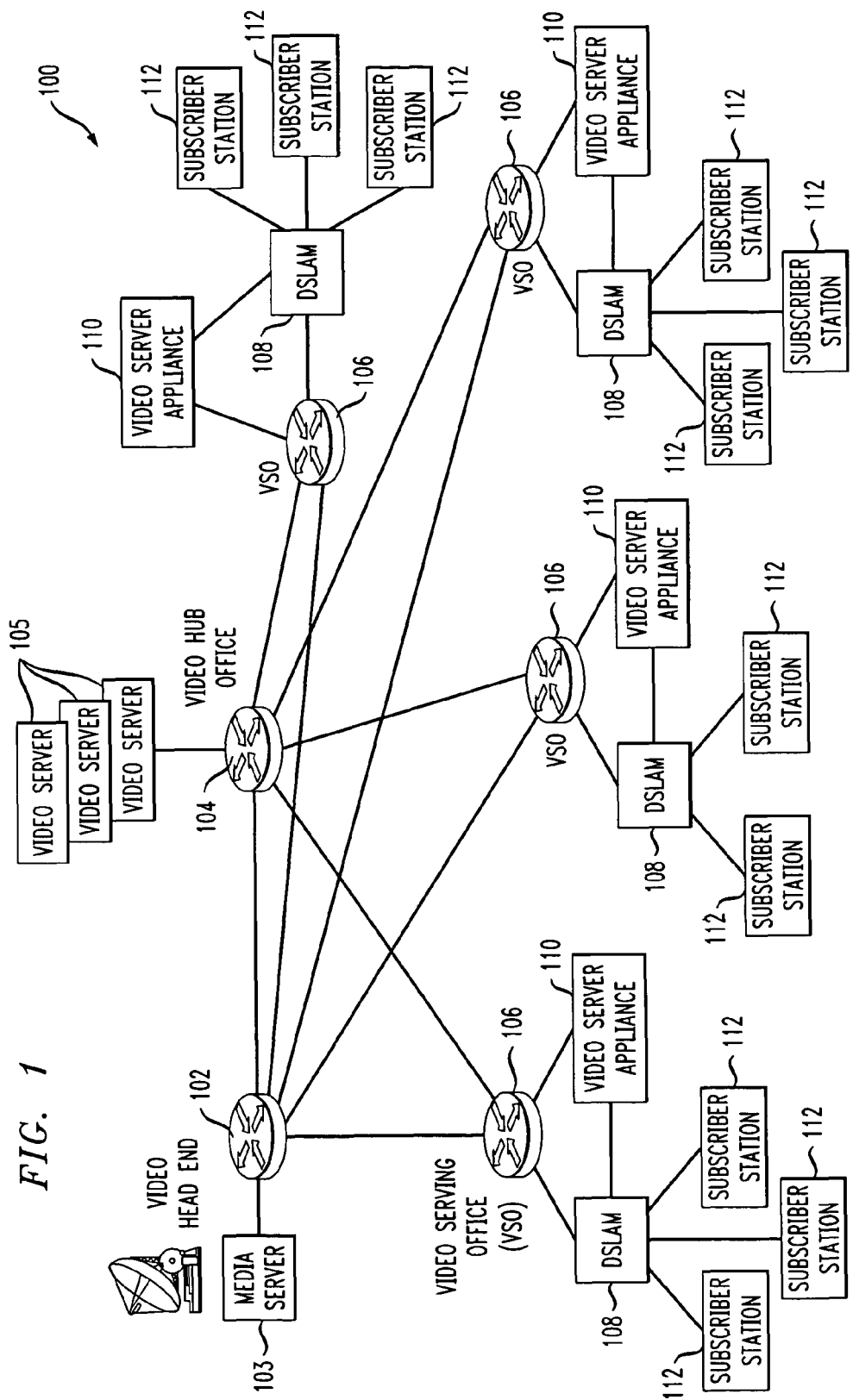
FIG. 1 is a block diagram depicting at least a portion of an exemplary multimedia distribution system in which the techniques of the present invention may be implemented.

The present invention will be described herein in the context of an illustrative IPTV appliance for delivering IPTV and media streaming services to subscriber clients. It should be understood, however, that the present invention is not limited to these or any particular IPTV architectures and/or methodologies. Rather, the invention is more generally applicable to techniques for more efficiently distributing streaming multimedia content over a network. Additionally, although the multimedia distribution techniques of the invention are shown and/or described as being preferably implemented on a card, also referred to herein as a "blade," in a media server or other network system, the techniques of the invention may be implemented by a processor (e.g., network processor), or alternative processing means, in an adjunct system. The techniques of the invention may be used in an IPTV application as well as other media streaming applications, such as, for example high definition (HD) radio.

IPTV describes a system wherein a digital television service is delivered to subscribing end clients using an Internet Protocol (IP) over a broadband connection, such as, but not limited to, the Internet, Ethernet, etc. This service is often provided in conjunction with VOD and may also include Internet services, such as, for example, Web access and Voice over IP (VOIP). IPTV covers both live television (e.g., multicasting), as well as stored video (e.g., VOD). The playback of IPTV typically requires either a personal computer (PC), set-top box (STB), or other computing apparatus connected to a television set. Video content is typically a Motion Pictures Expert Group Level 2 (MPEG2) transport stream delivered via IP multicast, a method in which information can be sent to multiple computers simultaneously, with the H.264 format thought to replace the older MPEG2. In standards-based IPTV systems, the primary underlying protocols used for IPTV are Internet Group Management Protocol (IGMP) version 2 for channel change signaling for live TV, and Real Time Streaming Protocol (RTSP) for stored video. The IGMP is described, for example, in the document Request for Comments (RFC) 1112, entitled "Host Extensions for IP Multicasting" (August 1989), which is incorporated by reference herein. The RTSP is described, for example, in the document RFC 2326, entitled "Real Time Streaming Protocol" (April 1998), which is incorporated by reference herein.

As previously stated, most streaming multimedia applications require a time-based buffer, sometimes referred to as a jitter buffer, at the subscriber system in order to prevent multimedia content loss and/or degradation during channel change and playout. The term "playout," as used in a broadcasting context, may be defined as the transmission of radio or TV channels from the broadcaster into a network or networks delivering the content to an audience (e.g., listeners or viewers). Whenever a request for a channel change is initiated by an end client, there can be significant delay while the jitter buffer is cleared and subsequently reloaded with streaming content from the new channel. In the case of IPTV, this can result in pixelation, blank screen, scrambled video, etc., of the streaming multimedia content during startup while the jitter buffer is being filled. This delay in presenting the streaming multimedia content during a channel change is often referred to as "channel change latency."

The term "channel" as used herein is intended to include a wireless communication link, such as, for example, cellular, radio frequency (RF), infrared (IR), microwave, satellite, etc., and may also include a dedicated communication line, such as, for example, telephone, cable, fiber optic, etc. A channel may have a certain data rate associated therewith which determines how many samples per second can be transmitted on that particular media. Lower rate channels can be aggregated into a single higher rate channel by using, for example, multiplexers, as understood by those skilled in the art. Likewise, lower rate channels can be extracted from a higher rate channel by using, for example, demultiplexers.

FIG. 1 is a block diagram depicting at least a portion of an exemplary multimedia distribution system 100 in which the techniques of the present invention may be implemented. The multimedia distribution system 100 preferably comprises at least one streaming video head end (VHE) 102 including one or more media servers 103 for supplying multimedia content, at least one video hub office (VHO) 104 including one or more video servers 105, and a plurality of video serving offices (VSOs) 106. The VHE 102, VHO 104, and VSOs 106 typically comprise switching and/or routing circuitry associated therewith which, together, form an aggregation and distribution network for multimedia content. Each VSO 106 preferably connects to one or more digital subscriber line access multiplexers (DSLAMs) 108 and to one or more video server appliances 110. Each of the video server appliances 110 are preferably also connected to a corresponding one of the DSLAMs 108. A plurality of subscriber stations 112, which ultimately receive the streaming multimedia content from the VHE 102, are preferably connected to corresponding DSLAMs 108 in the multimedia distribution system 100.

Examples of subscriber stations include, but are not limited to, set-top boxes (STBs), network appliances, computers, televisions, and other devices.

As "take rates" (e.g., the percentage of all homes passed that subscribe to a given service) grow beyond the capability of a centralized server model, a network processor based model can be distributed to the VSOs 106 for efficient data plane connections, thereby minimizing the need for additional servers at the VSOs, and requiring fewer servers in the VHO 104. Using the multimedia distribution architecture of an embodiment of the present invention, IPTV stream traffic management and shaping function can be distributed deeper in the access network for delivery of broadcast and on-demand video to the VSOs 106. Distribution of the video stream processing provides increased scalability to numerous channels or content sources and essentially unlimited subscribers. Appliance deployments only grow when required and reuse existing server management and infrastructure, thus supporting an efficient use of network resources. Further gains are realized, for example, by providing data plane video connectivity directly to the VSOs 106 from the VHE 102 and no longer requiring a fully meshed data plane connection from the VHO 104 to the VSOs.

Using a network processor implementation allows IPTV networks to elegantly scale in a centralized service delivery model, in at least one aspect, by separating the control plane and video data plane function at the VHO server(s) 105 and optimizing per-user IPTV content (e.g., standard definition, high-definition, VOD, etc.) delivery. Since the video data plane and the control plane functions are preferably already separated in the network processor based centralized architecture, the distributed model can be easily implemented, in at least one aspect, by physically moving the video data plane function to the VSOs 106 using, for example, a corresponding video server appliance 110 and retaining an optimized control plane server in the VHO 104. In this manner, the distributed model continues to behave logically as in the centralized model for the control plane, but now provides more optimal video delivery at the VSO. Moreover, since the video data plane is now distributed to the VSOs 106 which are already connected to the VHE 102, there is no longer a requirement for high bandwidth connections between the VHO 104 and the VSOs 106, thus saving significant network bandwidth and resources.

Figure 2:
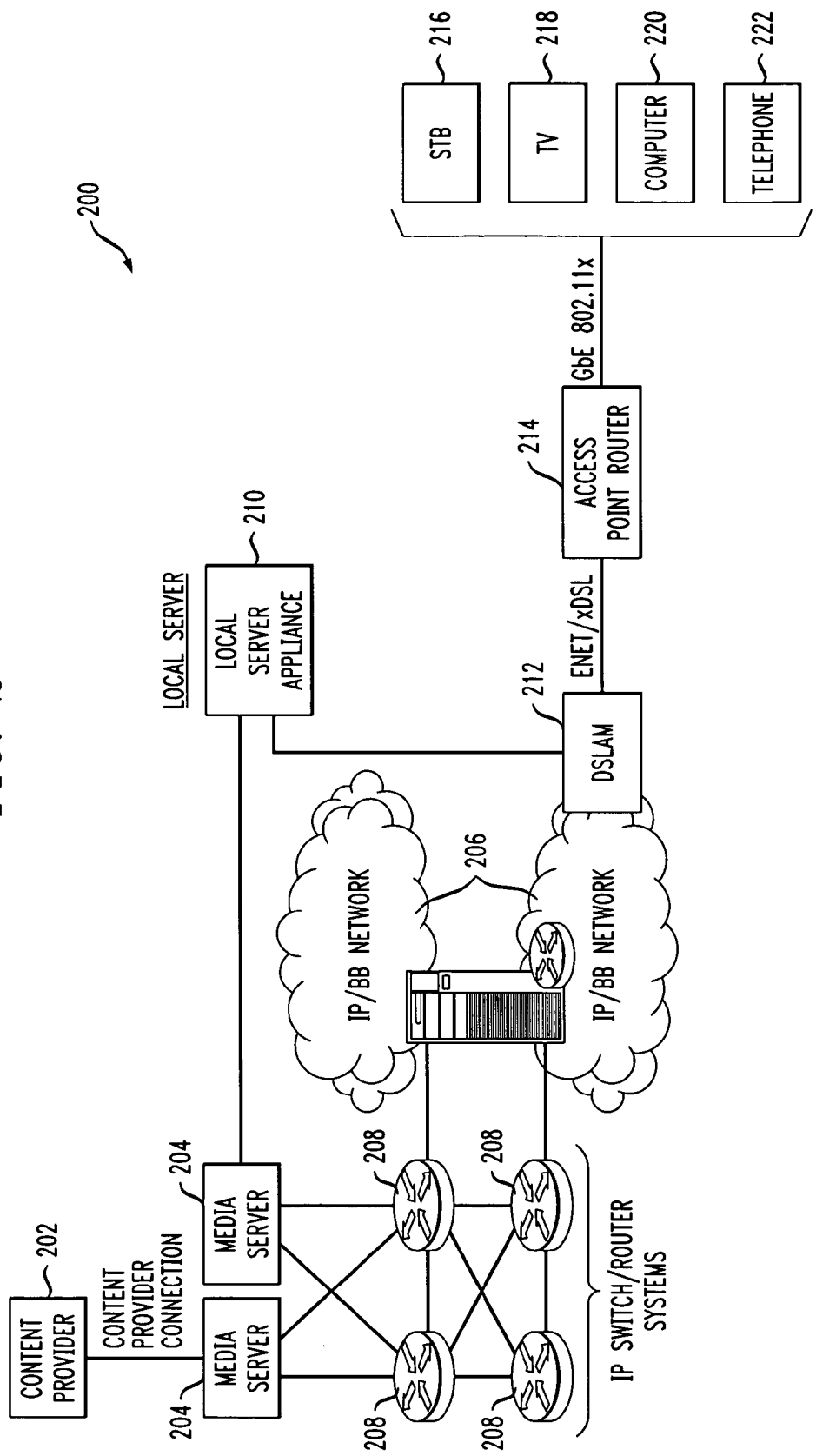
FIG. 2 is a block diagram depicting at least a portion of an exemplary IPTV distribution architecture, in accordance with one aspect of the invention

FIG. 2 is a block diagram depicting at least a portion of an exemplary IPTV distribution architecture 200, in accordance with one aspect of the invention. The exemplary distribution architecture 200 includes at least one content provider 202, or other multimedia source, supplying multimedia content to one or more media servers 204, preferably in a distributed fashion. The media servers 204 are coupled to a network 206, which may be a broadband (BB) network, an IP network, or an alternative wired or wireless network, via one or more IP switch/router systems 208 for routing data traffic between the network 206 and the content provider 202. The switch/router systems 208 may be implemented in a conventional fashion as will be known by those skilled in the art. The distribution architecture 200 further includes a local server appliance 210 operatively connected to a corresponding DSLAM 212, which is preferably coupled to IP/BB network 206. The local server appliance 210 is also preferably coupled to at least one of the media servers 204.

One or more subscriber stations, such as, for example, a STB 216, a television set 218, a computer 220, a telephone 222, etc., may be connected to a corresponding DSLAM 212 via an access point router 214 providing a wireless local area network (WLAN) connection, for example, gigabit Ethernet (GbE), or an alternative connection arrangement (e.g., wired and/or wireless link). A WLAN communication protocol commonly used by access point routers is, for example, an Institute for Electrical and Electronics Engineers (IEEE) 802.11 protocol, although the invention is not limited to any particular connection arrangement and/or communication protocol.

In accordance with aspects of the present invention, using a processor, such as, for example, a network processor, with adjunct memory as a card in an existing media server, or as a separated dedicated network system appliance, the functions of buffering video data and forwarding such video data to a subscriber station are advantageously offloaded from the media server. The network processor subsystem allows the combination of centralized control and software leverage, with a scalable and distributable hardware implementation.

It is to be appreciated that the term "processor" as used herein is intended to include any processing device, state machine, etc., such as, for example, one that includes a central processing unit (CPU) and/or other processing circuitry. Moreover, the term "processor" may refer to more than one processing device, and various elements associated with a processing device may be shared by other processing devices. The term "memory" as used herein is intended to include memory associated with a processor or CPU, such as, for example, registers, random access memory (RAM), read-only memory (ROM), flash memory, etc.

Figure 3:
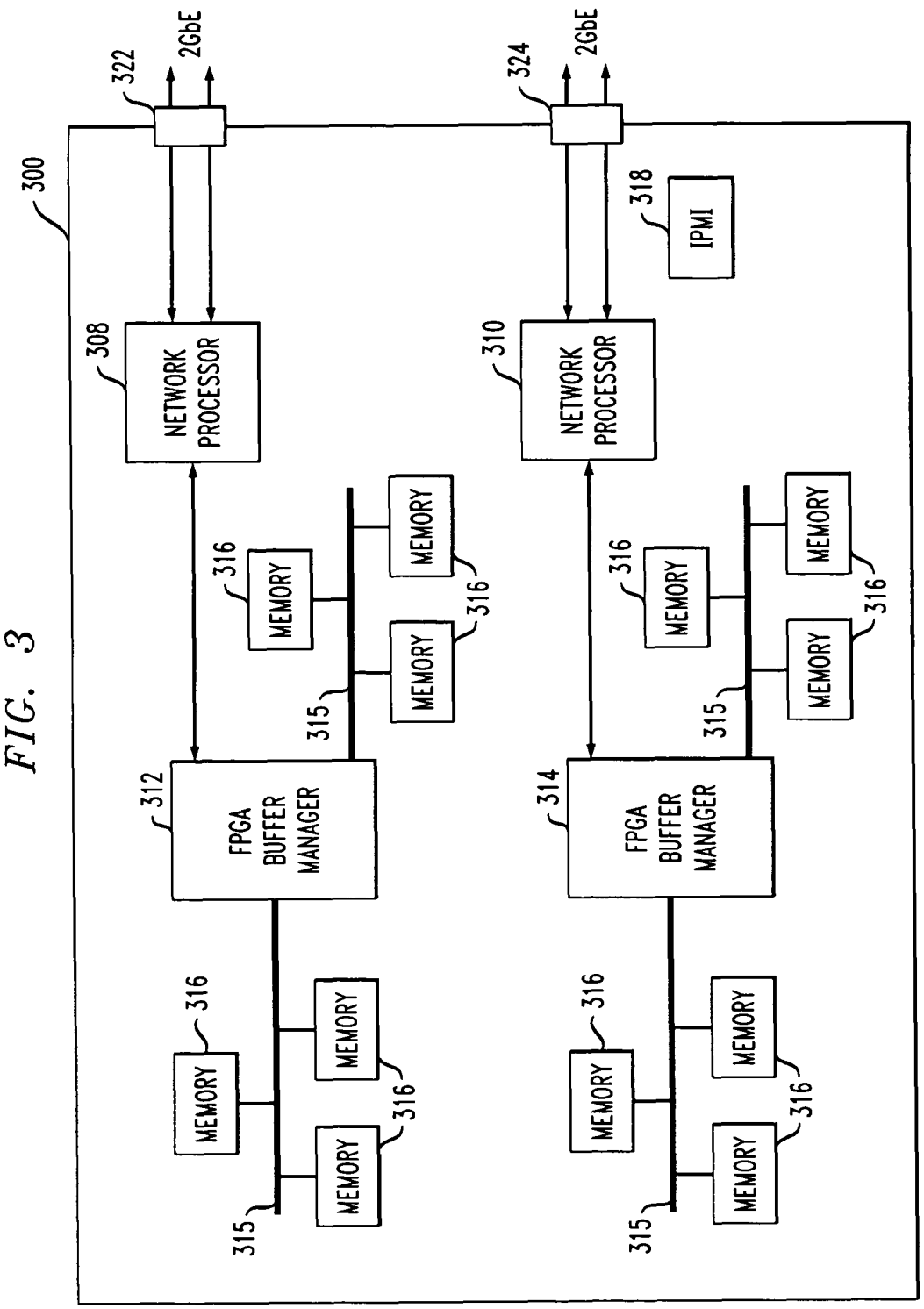
FIG. 3 is a block diagram illustrating at least a portion of an exemplary network processing card, in accordance with an embodiment of the invention.

FIG. 3 is a block diagram illustrating at least a portion of an exemplary network processing card 300, in accordance with an embodiment of the invention. The exemplary network processing card 300 comprises two network processors, 308 and 310, although the invention is not limited to any particular number of processors. Each of the network processors 308, 310 may be implemented using, for example, an Agere PayloadPlus® (a registered trademark of Agere Systems Inc.) 300 (APP300) network processor chip manufactured by Agere Systems Inc. It is to be understood, however, that the invention is not limited to a specific manufacturer component number or type of part. Network processing card 300 further comprises two field programmable gate-array (FPGA) buffer managers, 312 and 314, or alternative memory management circuitry, operatively connected to network processors 308 and 310, respectively, a plurality of memories 316, and an IP multicast interface (IPMI) block 318, or alternative multicast interface circuitry, connected to at least one of the network processors. The memories 316 may be connected to a corresponding FPGA buffer manager 312, 314 via corresponding buses 315 and are preferably operative for storing at least a portion of one or more multimedia streams received by the network processing card 300. In other embodiments of the invention, the buffer management functions, performed in this illustrative embodiment by FPGA buffer managers 312, 314, may alternatively be implemented within the processors (s), 308, 310.

Each network processor 308, 310 is preferably operative to receive a corresponding multimedia stream transmitted by, for example, a media content provider at a SVHE (not shown) in the multimedia distribution network. Each of the multimedia streams may be conveyed to a corresponding network processor 308, 310 via a 2 GbE port, 322 and 324, respectively, or an alternative communication link. The media streams are buffered into memory 316 via corresponding FPGA buffer managers 312, 314. Then, in accordance with an aspect of the invention, as a request for channel change or media stream is handled, the network processor 308, 310 pulls the media stream out of the buffer manager 312, 314, respectively, at a higher rate and preferably performs traffic shaping in order to optimize or guarantee performance, low latency, and/or bandwidth requirements for a particular end client buffer in one of the subscribing stations 112. The network processor 308, 310 subsequently applies traffic management among multiple streams, based at least in part on certain characteristics associated with the end clients (e.g., playout quality) and end client channel requests, to forward multiple streams onto the network for delivery to the subscribing stations 112.

Traffic shaping generally deals with concepts such as classification, queue disciplines, enforcing policies, congestion management, quality of service (QoS), fairness, etc. Traffic shaping provides a mechanism for controlling the volume of data traffic being sent into a network (e.g., bandwidth throttling), and the rate at which the traffic is being sent (e.g., rate limiting), as may be required in order to prevent overrun of end client connections or STBs. Traffic management, on the other hand, generally involves bandwidth subscription coupled with traffic priority to offer a dynamic and adaptive mechanism to control the wide spectrum of traffic typical of a network environment.

In accordance with another aspect of the invention, server appliances and/or cards employed in the distribution system are preferably operative to combine traffic management and shaping functionalities with streaming media time compression and distribution. Such time compression and distribution are performed by the network processor rather than by the STB. Thus, the STB essentially has no awareness that the media stream has been sped up during channel switching. The centralized server preferably handles requests (e.g., channel change) from end clients, validates these requests, and then forwards the requests to the network processor, whether local or remote to the server. The server need not communicate directly with the end clients and therefore the end clients are essentially isolated from changes in the number and/or location of server appliances as the network evolves (e.g., expands or contracts).

When a channel change request is initiated by a subscribing client, for example through an end client subscribing station 112 (e.g., STB), and is detected by a corresponding DSLAM, the rate at which the multimedia stream is pulled out of the buffer manager 312, 314 is preferably modified to be substantially higher than a normal streaming rate, at least during a prescribed period of time following the channel change request. This process may be referred to herein as "over rating." A higher than normal streaming rate may be defined as the rate at which multimedia content associated with a particular channel is delivered to the end client following a channel change during which the subscribing client buffer is being filled. This higher rate (e.g., overspeed rate) is preferably about 1.3 to about 1.5 times the normal streaming rate, although the invention is not limited to any particular rate. Furthermore, the period of time during which the multimedia stream is pulled out of the buffer manager 312, 314 at the higher rate is preferably about 100 milliseconds (ms) to about several seconds (e.g., 5 seconds), although the invention is not limited to any particular duration of time.

The overspeed rate and the duration of time during which the multimedia stream is pulled out of the buffer manager at the overspeed rate is preferably a function of an amount of delay in the network and/or a prescribed minimum amount of buffering of the multimedia stream. The duration of time (in seconds), $t_R$, at which the higher rate, R, is utilized can be determined by the relation:

$$t_R = \frac{S_{Buff}}{R-1}, \quad (1)$$

where the term $S_{Buff}$ in equation (1) above represents a prescribed minimum buffering amount (in seconds). By way of example only and without limitation, assuming an overspeed rate of 1.3 times the normal streaming rate and a prescribed minimum buffering of 1.5 seconds, the duration of time at which the overspeed rate is used can be determined to be about 5 seconds. Likewise, when the overspeed rate is increased to 1.5 times the normal streaming rate, the duration of time at which the overspeed rate is required decreases to about 3 seconds. The overspeed rate is generally limited by the bandwidth of the network. In this manner, the present invention provides a means of momentarily time-compressing the multimedia stream during channel changing so as to speed up the filling of the subscribing client buffer, thereby substantially eliminating dithering and/or reducing the time required for a new channel to be delivered and displayed.

Figure 4:
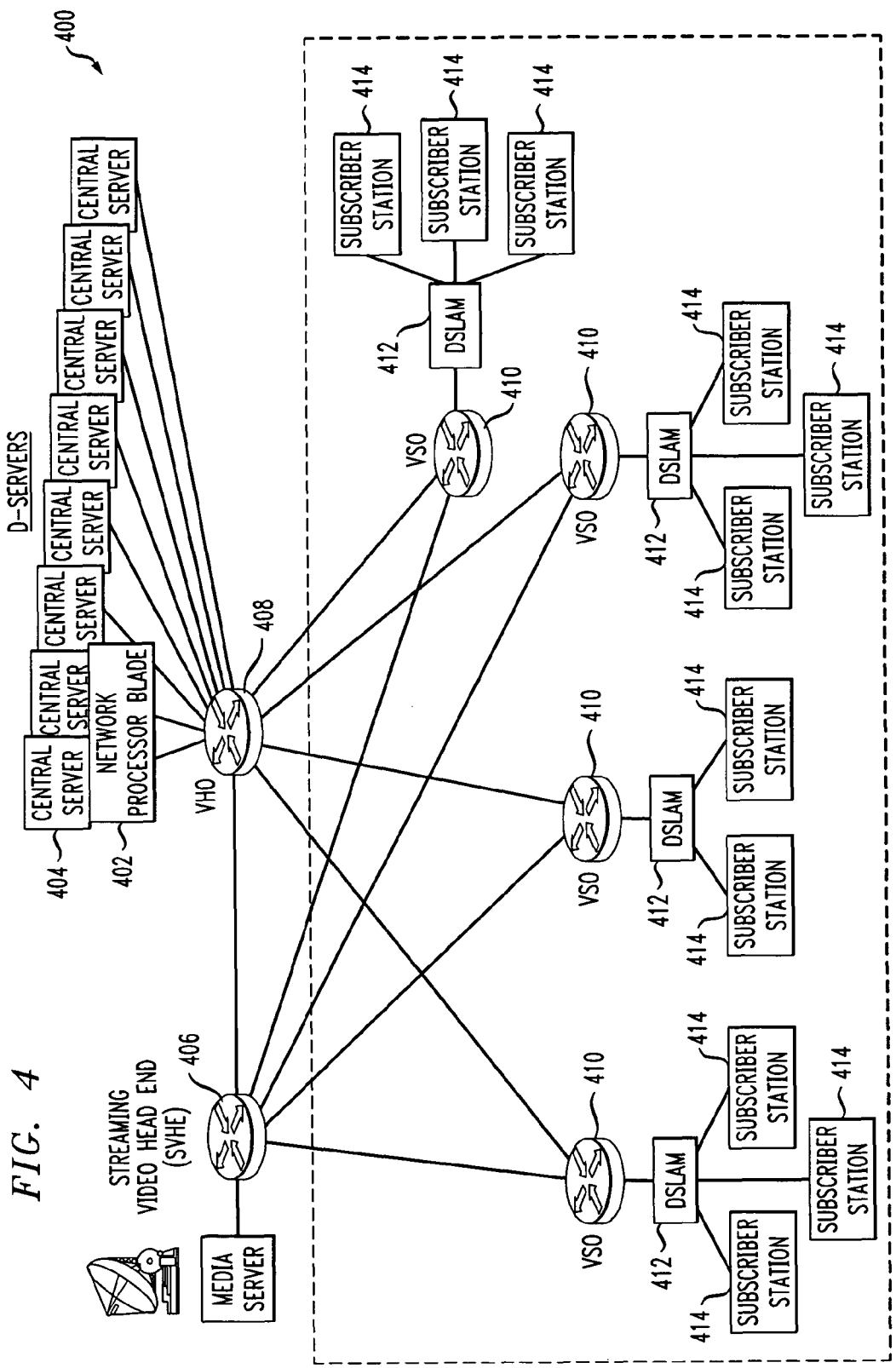
FIG. 4 is a block diagram depicting at least a portion of an exemplary multimedia distribution system wherein a network processing card is implemented as a network processor blade in a central server, in accordance with an embodiment of the invention.

FIG. 4 is a block diagram depicting at least a portion of an exemplary multimedia distribution system 400 including a network processor blade 402 in a central server 404 for carrier grade scale and performance, in accordance with an embodiment of the invention. As apparent from the figure, the network processor blade 402, which can be implemented in a manner similar to networking processing card 300 shown in FIG. 3, may be connected in the distribution system 400 including a streaming video head end (SVHE) 406, a VHO 408, a plurality of VSOs 410, a plurality of DSLAMs 412 connected to corresponding VSOs, and a plurality of subscriber stations 414 (e.g., STBs) connected to corresponding DSLAMs.

Figure 5:
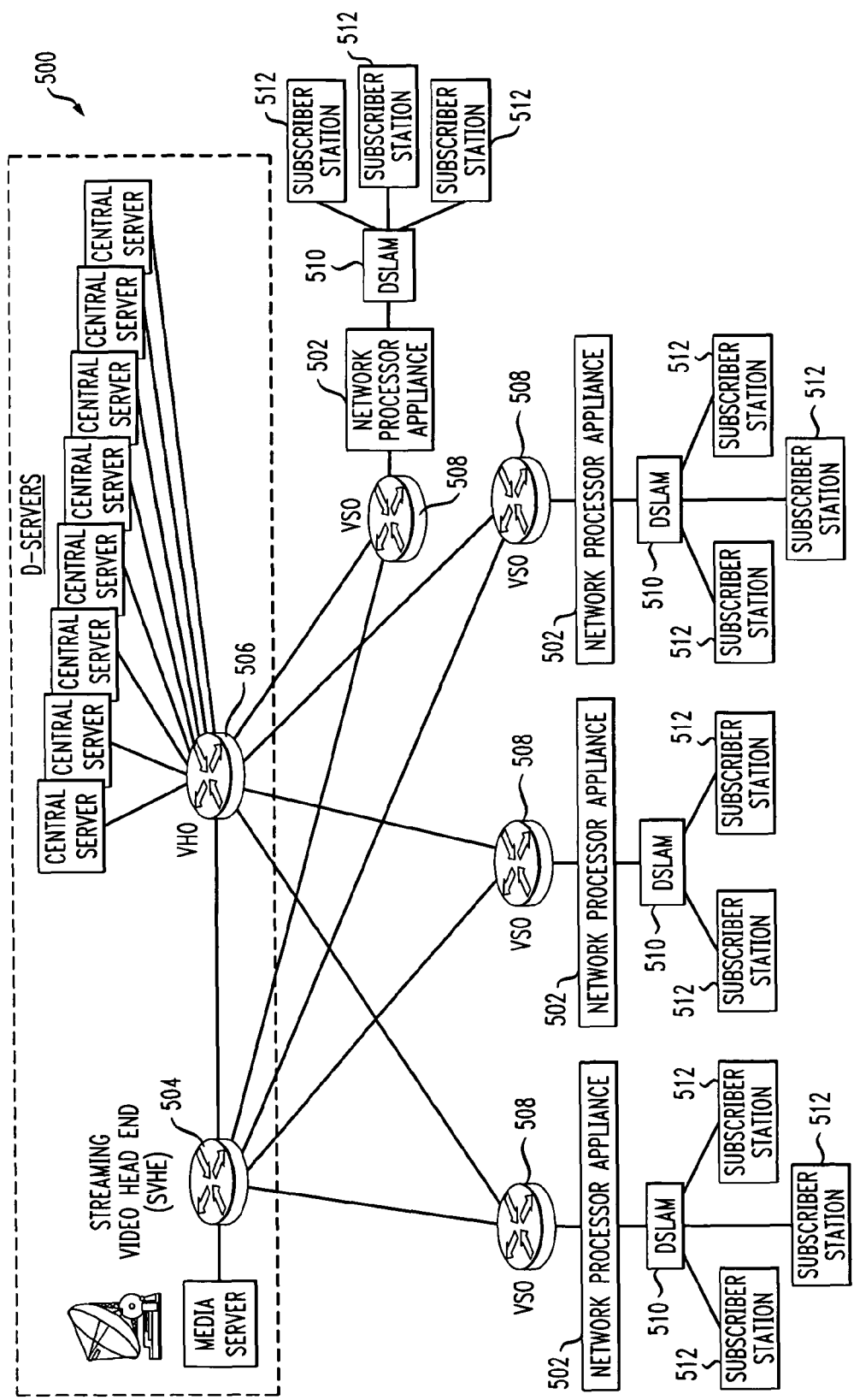
FIG. 5 is a block diagram depicting at least a portion of an exemplary multimedia distribution system in which a network processing card is implemented in a network processor appliance, in accordance with an embodiment of the invention.

FIG. 5 is a block diagram depicting at least a portion of an exemplary multimedia distribution system 500 in which a network processing card is implemented in each of a plurality of a network processor appliances 502, in accordance with an embodiment of the invention. As apparent from the figure, each network processor appliance 502, which can be implemented in a manner similar to networking processing card 300 shown in FIG. 3, may be connected in the distribution system 500 including a SVHE 504, a VHO 506, a plurality of VSOs 508, a plurality of DSLAMs 510, and a plurality of subscriber stations 512 (e.g., STBs) connected to corresponding DSLAMs. The network processor appliances 502 are preferably connected between a corresponding VSO 508 and a corresponding DSLAM 510 in the multimedia distribution system 500. In this distributed embodiment, the network processor appliances 502 advantageously offload at least some of the bandwidth-intensive functionalities of the central servers, so as to enable the central servers to more efficiently maintain a centralized management point for the multimedia distribution system.

In a traditional analog cable television (CATV) setting, changing channels is a quick and relatively simple process. At the press of a button, the STB instructs a tuner included therein to simply monitor a different frequency. Once the new frequency is locked onto, the image can be processed and displayed on the TV screen. In a digital IPTV environment, however, changing channels is considerably more complex. For instance, changing channels typically involves issuing channel add and drop requests, also referred to as join and leave requests, respectively, rather than just changing frequencies. A standard protocol which may be used to handle channel change requests is IGMP version 3, which is described in the document RFC 3376, entitled "Internet Group Management Protocol, Version 3" (October 2002), which is incorporated by reference herein.

When a subscriber presses the remote control to change the channel, a number of events occur, some of which will be described below in simplified terms. By way of example only, a remote control device associated with a given STB sends a channel change signal to the STB. The STB receives the channel change signal, processes the command, and issues IGMP drop and add requests to the network (e.g., a request to leave the channel currently being viewed and a request to join a new channel). A residential gateway (RG) device to which the STB is connected sees the IGMP add request and either passes the IGMP request through to the network or, if the RG is IGMP-aware, and if the new channel already exists at the RG (e.g., another member of the household is already watching the requested channel from a different STB but through the same RG), the RG can just start copying the new channel stream to the requesting STB. At the same time, the RG intercepts the add action. The IGMP add request is then passed to a corresponding DSLAM.

The DSLAM, upon receiving the IGMP add request, performs one of at least two functions. First, the DSLAM can pass the IGMP add request through to the network, especially if the DSLAM does not have any IGMP proxy function. Second, the DSLAM can merely intercept the IGMP add request and copy the existing traffic to a subscriber port. In either case, the IGMP add request is then passed to an aggregation router, which may comprise one or more VSOs. When the aggregation router receives the IGMP add request, one of at least two actions may be performed. First, if the add request is for a newly subscribed channel not available at the aggregation router, the add request is passed to a distribution router, which may include one or more VHOs. Second, if the requested channel is available to the aggregation router, the requested channel traffic is copied to an egress port. The multimedia content provider at the SVHE always supplies the distribution router with all channels. When an add request is received, the distribution router simply starts copying the intended multicast stream to the egress port to be delivered to the subscriber STB. Packets for the subscribed channel will start flowing in through an Ethernet interface, or alternative communication interface, and are eventually stored in a jitter buffer in the STB.

As previously explained, during a channel change the multimedia stream is pulled from memory by the FPGA buffer manager at a substantially higher rate compared to the normal streaming rate, for at least a certain period of time following the channel change request. Consequently, the jitter buffer will more rapidly accumulate data from the incoming stream until a prescribed threshold is reached, at which point a decoding process is initiated on the multimedia stream. Although the size of the jitter buffer may vary according to vendor, the methodologies of the present invention provide a mechanism for filling the jitter buffer faster than standard multimedia distribution approaches, thereby reducing channel change latency in the system, among other advantages.

By way of example, and without loss of generality, an illustrative packet flow in the network processor will now be described. For processing MPEG unicast requests, MPEG Level 4 (MPEG4) traffic arriving from a core media server is preferably classified, enqueued per channel by the network processor (e.g., 308, 310 in FIG. 3) and then scheduled and forwarded to the FPGA buffer manager (e.g., 312, 314) via a System Packet Interface Level 3 (SPI-3) interface, or an alternative communication means, for caching and/or storage. The FPGA buffer manager preferably caches, for each channel, about ten seconds of most recent video stream using, for example, circular queues (e.g., circular buffers). In this manner, a read pointer associated with the circular queues will essentially always point to the beginning of a ten seconds old video stream until a request for read-out arrives.

For processing unicast requests and video streaming, an end client STB unicast request is first recognized by a classifier. The request is then sent to the FPGA buffer manager which starts transmitting ten seconds of the requested stream to the network processor (e.g., APP300) via an SPI-3 interface, or via alternative communication means, at a rate (e.g., an over-speed rate) which is substantially higher than normal streaming rates. The network processor receives and enqueues the requested stream. The video stream is then read from the appropriate network processor queue and shaped at the higher over-speed rate to ensure that a jitter buffer in the STB is not overrun.

In accordance with an illustrative embodiment of the invention, a network processing card (e.g., shown in FIG. 3) and/or a network processing appliance (e.g., shown in FIG. 4) may be configured such that a first GbE link corresponding to a first network processor (e.g., 308) receives unicast traffic from a core media server, or an alternative multimedia source, continuously for all channels, and a second GbE link corresponding to a second network processor (e.g., 310) receives requests for unicast channels from end client STBs in one direction and streams unicast video to the STBs via a corresponding DSLAM in the other direction.

In an illustrative embodiment of the invention, an Agere Systems APP300 network processor is connected to a FPGA buffer manager via 16-bit SPI-3 interfaces which runs at about 104 megahertz (MHz), providing a total bandwidth of about 1.6 gigabits per second (Gbps). If the required over-speed rate towards the STB is 1.4 times, then the maximum amount of video traffic the APP300 should receive from the core media server on a GbE link is about 1 Gbps/1.4, or about 700 megabits per second (Mbps). Assuming usage of MPEG-4 video codec level 1 (VC-1) enhanced encoding, a high-definition (HD) channel will require about 8 Mbps of bandwidth while a standard definition (SD) channel will require about 1.5 Mbps of bandwidth. Moreover, assuming availability of 100 HD and 400 SDTV channels, the bandwidth needed to receive 50 unicast HD channels from a core media server (e.g., half of the available HD channels) would be 50×8 Mbps=400 Mbps. The remaining 300 Mbps of bandwidth can be used to receive 200 SDTV channels (e.g., 200× 1.5 Mbps=300 Mbps).

The APP300 network processor has a total throughput (input and output) of about 2 Gbps. Total input throughput required in this exemplary application would be about 700 Mbps unicast streams from the core media server plus about 980 Mbps from the FPGA buffer manager (over-speed channels) plus unicast request messages from STBs (e.g., about a few Mbps), resulting in a total required throughput which is less than the 2 Gbps available from the APP300 network processor. Similarly, total output throughput required in this example would be about 700 Mbps towards the FPGA buffer manager plus about 980 Mbps downlink to the DSLAM, resulting in a total required throughput which is less than 2 Gbps. With two APP300 chips on a network processing card, all 100 HD and 400 SD TV channels can be supported.

With regard to memory requirements, the FPGA buffer manager, assuming a caching requirement of about 10 seconds, will need about: 50 HDTV channels×10 seconds×1 Mbps=500 Mbps; 200 SDTV channels×10 seconds×1.5 Mbps=375 Mbps (about 3 Gbps). Thus, in total about 1 gigabyte (GB) of memory would be sufficient per FPGA buffer manager. A Cyclone® (a registered trademark of Altera Corporation) II FPGA (e.g., part no. EP2C20f484-8), manufactured by Altera Corporation, supports up to 4 GB of attached dual data rate (DDR) synchronous dynamic random access memory (SDRAM), and is therefore suitable for use in the illustrative network processing card.

At least a portion of the streaming multimedia distribution methodologies of the present invention may be implemented in one or more integrated circuits. In forming integrated circuits, a plurality of identical die is typically fabricated in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. Apparatus for distributing streaming multimedia to at least one end client over a network, the apparatus comprising:
   memory; and
   at least one processor operatively connected to the memory, the at least one processor being operative: (i) to receive the streaming multimedia from at least one multimedia source via at least one of a plurality of channels in the network; (ii) when a channel change request generated by the end client for changing a channel and corresponding multimedia content from the multimedia source is not detected, to deliver the at least one multimedia stream to the end client at a first data rate; and (iii) when the channel change request has been detected, to deliver the at least one multimedia stream to the end client at a second data rate for a prescribed duration of time after receiving the channel change request and, after the prescribed duration of time, to deliver the at least one multimedia stream to the end client at the first data rate, wherein the second data rate is greater than the first data rate;
   wherein the prescribed duration of time is determined as a function of a ratio of the second data rate to the first data rate and an amount of buffering of the at least one multimedia stream.

2. The apparatus of claim 1, wherein the at least one processor is operative to detect whether or not the channel change request has been generated by the end client for changing a channel and corresponding multimedia content from the multimedia source.

3. The apparatus of claim 1, further comprising memory management circuitry connected between the memory and the at least one processor, the memory management circuitry being operative to interface between the at least one processor and the memory for at least one of storing data in the memory and retrieving data from the memory.

4. The apparatus of claim 1, wherein the prescribed duration of time is substantially equal to:

$$t_R = \frac{S_{Buff}}{R-1},$$

where $t_R$ is the prescribed duration of time, R is the ratio of the second data rate to the first data rate, and $S_{Buff}$ is the amount of buffering of the at least one multimedia stream.

5. The apparatus of claim 1, wherein the prescribed duration of time is less than about five seconds.

6. The apparatus of claim 1, wherein the second data rate is at least 1.3 times faster than the first data rate.

7. The apparatus of claim 1, wherein the at least one processor comprises a network processor.

8. The apparatus of claim 1, wherein the apparatus is included in a network processor appliance in a multimedia distribution network comprising at least one streaming video head end, at least one video hub office operatively coupled to the video head end, a plurality of video serving offices operatively coupled to at least one of the at least one streaming video head end and the at least one video head end, and a plurality of digital subscriber line access multiplexers, each of the plurality of digital subscriber line access multiplexers being operatively coupled to a corresponding one of the plurality of video serving offices, the network processor appliance being operatively coupled between at least a corresponding one of the plurality of video serving offices and at least a corresponding one of the plurality of digital subscriber line access multiplexers.

9. The apparatus of claim 1, wherein the apparatus is included in a media server in a multimedia distribution network comprising at least one streaming video head end, at least one video hub office operatively coupled to the video head end, a plurality of video serving offices operatively coupled to at least one of the at least one streaming video head end and the at least one video head end, and a plurality of digital subscriber line access multiplexers, each of the plurality of digital subscriber line access multiplexers being operatively coupled to a corresponding one of the plurality of video serving offices, the media server being operatively coupled to the at least one video hub office.

10. The apparatus of claim 1, wherein the processor is operative to perform traffic shaping for controlling at least one of a volume of data traffic being sent into the network and a rate at which the data traffic is being sent in the network.

11. The apparatus of claim 1, wherein the at least one processor receives the streaming multimedia from at least one multimedia source via at least one gigabit Ethernet communication channel.

12. The apparatus of claim 1, wherein the network comprises at least one of a broadband network and an Internet Protocol network.

13. The apparatus of claim 1, wherein the streaming multimedia comprises Internet Protocol television data traffic.

14. The apparatus of claim 1, further comprising multicast interface circuitry connected to the at least one processor.

15. An integrated circuit including at least one apparatus for distributing streaming multimedia to at least one end client over a network, the at least one apparatus comprising:
  memory; and
  at least one processor operatively connected to the memory, the at least one processor being operative: (i) to receive the streaming multimedia from at least one multimedia source via at least one of a plurality of channels in the network; (ii) when a channel change request generated by the end client for changing a channel and corresponding multimedia content from the multimedia source is not detected, to deliver the at least one multimedia stream to the end client at a first data rate; and (iii) when the channel change request has been detected, to deliver the at least one multimedia stream to the end client at a second data rate for a prescribed duration of time after receiving the channel change request and, after the prescribed duration of time, to deliver the at least one multimedia stream to the end client at the first data rate, wherein the second data rate is greater than the first data rate;
  wherein the prescribed duration of time is determined as a function of a ratio of the second data rate to the first data rate and an amount of buffering of the at least one multimedia stream.

16. The integrated circuit of claim 15, wherein the at least one processor is operative to detect whether or not the channel change request has been generated by the end client for changing a channel and corresponding multimedia content from the multimedia source.

17. The integrated circuit of claim 15, further comprising memory management circuitry connected between the memory and the at least one processor, the memory management circuitry being operative to interface between the at least one processor and the memory for at least one of storing data in the memory and retrieving data from the memory.

18. The integrated circuit of claim 15, wherein the prescribed duration of time is substantially equal to:

$$t_R = \frac{S_{Buff}}{R-1},$$

where $t_R$ is the prescribed duration of time, R is the ratio of the second data rate to the first data rate, and $S_{Buff}$ is the amount of buffering of the at least one multimedia stream.

19. The integrated circuit of claim 15, wherein the prescribed duration of time is less than about five seconds.

20. The integrated circuit of claim 15, wherein the second data rate is at least 1.3 times faster than the first data rate.

* * * * *